R. H. H. HUNT.
LOOM.
APPLICATION FILED SEPT. 8, 1903.

958,874.

Patented May 24, 1910.
8 SHEETS—SHEET 1.

Fig. 1.

Witnesses:
K Lockwood-Nevins.
Basia Gofinkel.

Inventor.
R. H. H. Hunt
By
Francis M. Wright
Attorney.

R. H. H. HUNT.
LOOM.
APPLICATION FILED SEPT. 8, 1903.

958,874.

Patented May 24, 1910.
8 SHEETS—SHEET 2.

Witnesses
K. Lockwood Nevins
Bessie Gorfinkel

Inventor
R. H. H. Hunt
By F. M. Wright.
Attorney

R. H. H. HUNT.
LOOM.
APPLICATION FILED SEPT. 8, 1903.

958,874.

Patented May 24, 1910.
8 SHEETS—SHEET 6.

Witnesses:
K. Lockwood Nevins.
Bessie Gorfinkel

Inventor.
R. H. H. Hunt
By F. W. Wright
Atty.

R. H. H. HUNT.
LOOM.
APPLICATION FILED SEPT. 8, 1903.

958,874.

Patented May 24, 1910.
8 SHEETS—SHEET 7.

UNITED STATES PATENT OFFICE.

ROBERT H. H. HUNT, OF SAN FRANCISCO, CALIFORNIA, ASSIGNOR TO ECONOMIC LOOM COMPANY, OF SAN FRANCISCO, CALIFORNIA.

LOOM.

958,874.  Specification of Letters Patent.  Patented May 24, 1910.

Application filed September 8, 1903. Serial No. 172,204.

*To all whom it may concern:*

Be it known that I, ROBERT H. H. HUNT, a citizen of the United States, residing at San Francisco, in the county of San Francisco and State of California, have invented certain new and useful Improvements in Looms, of which the following is a specification.

My invention relates to improvements in looms, the object of my invention being to provide an improved loom which will dispense with the necessity of replenishing a shuttle with filling thread, thereby economizing, first in avoiding the labor of making such replenishments, secondly, in the increased efficiency of the loom due to the saving of time which is at present consumed in stopping to fill the bobbin with the shuttle, thirdly in reducing the amount of yarn waste attendant upon the usual method of weaving, fourthly in the saving of power, requiring less force to operate the loom, fifthly in the avoidance of breakages both in the warp and in the filling thread on account of the reduced strain upon said threads, sixthly, in the first cost of the loom, permitting a lighter and simpler form of loom.

The main advantage attendant upon my improved construction is the saving of labor in the superintendence of the looms and in the supplying the shuttles with filled bobbins in the place of the empty ones. It is estimated that with this improved loom an operator can attend to many more looms than with the old method of weaving, so that each loom while doing at least as much work as in the old styles costs a small fraction of its former cost in wages. A further advantage is that the cloth so woven is of uniform quality and of great strength.

My invention resides in the improved construction and arrangement of parts for obtaining the above results.

In the accompanying drawing, Fig. 4 is a top plan view of the end of the lay and of the measuring device adjacent thereto; Fig. 5 is an end view of the same; Fig. 5ª is a broken perspective view of the end of the measuring arm; Fig. 23 is a diagrammatic view illustrating the method of weaving.

In this method of weaving, instead of the filling thread being supplied from a single source, namely, a bobbin carried in a shuttle, which source is replenished from time to time as exhausted, the filling thread is supplied from two separate sources, one at each side of the loom, each source of supply being sufficient for an indefinitely long run of the loom without replenishing. The filling threads are taken up from said sources alternately, and are laid in the warp in the manner illustrated diagrammatically in Fig. 23. The thread fed at each side of the loom is cut into lengths, each twice the width of the fabric, and each such length is doubled upon itself in the middle with a pick from the opposite side between the two halves, the ends of the length being carried in succession to the opposite side of the loom, while the middle of the length is left at the edge of the fabric on the same side of the loom from which the thread was taken, such lengths being supplied alternately from opposite sides of the loom, in the following manner:—The thread carrier takes the cut end of the thread and lays in the warp the first half *a* (Fig. 23) of the loop or length from the source of supply on one side of the loom; it then takes the end of the thread from the other side of the loom and lays the first half *b* of the loop or length from that side; while it is doing this the measuring device is measuring off the remaining half *c* of the first loop or length, so that when the thread carrier has returned, said half is measured and cut off, and the thread carrier now takes up the other end of the first length and carries it across and lays it in the warp and then in like manner takes up the second half *d* which has also been measured and cut off and lays that in the warp. The process is then repeated. Before proceeding to the description of these several parts the general construction of the loom may be particularly described, and, referring to the drawing, it will be seen that 1 represents the main driving shaft having fast and loose pulleys at one end and connected at the other end by toothed wheels with the counter shaft 2. Said shaft 2 is connected by means of a train of gears 3 with a cam shaft 4 extending across the loom at the lower part thereof and having mounted thereon cams 5 for operating the various parts of the mechanism. The warp is fed in the usual manner, and the heddles 6 are operated by the harness 7, also in the usual manner.

8 represents the lay which extends beneath the shed of the warp and over which passes the thread carrier 9.

Figure 1:
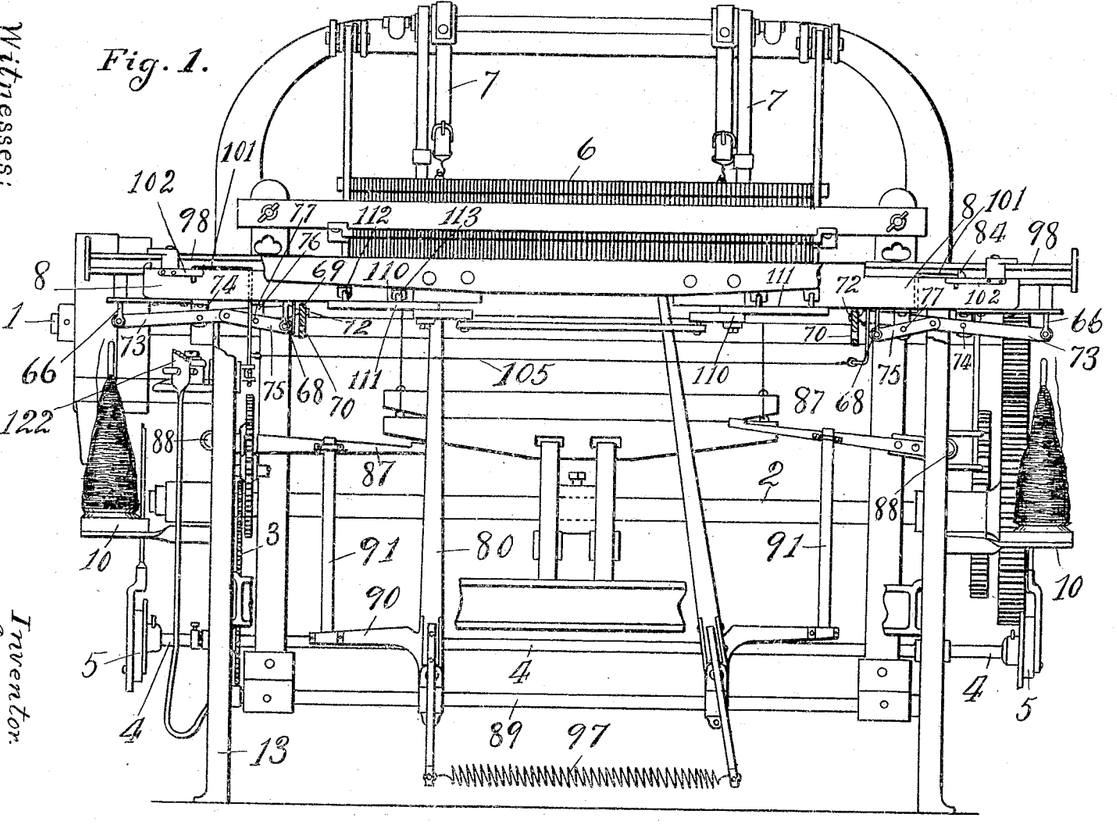
Figure 1 is a front elevation of the improved loom.
Figures 2, 3:
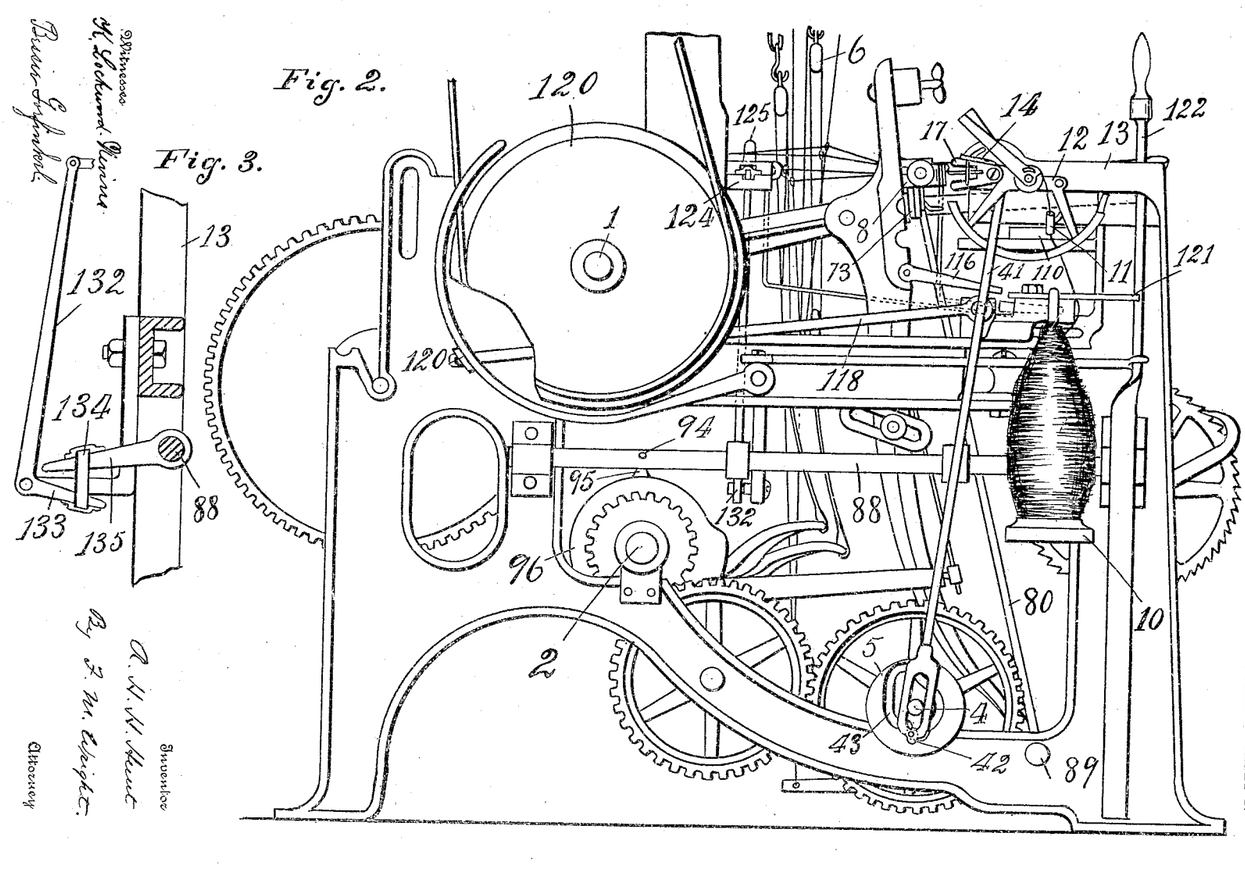
Fig. 2 is a side view of the same.
Fig. 3 is a sectional view of the auxiliary picker stick.

The filling thread may be wound on large bobbins or spindles which are placed in any convenient position for feeding to the loom. I have in Fig. 1 shown the same as placed upon brackets 10 at the sides of the loom, but other modes of supplying the filling thread will be described. From each bobbin the thread passes through a guide loop 11 secured upon a bracket 12, which is attached to the frame 13 of the loom, and then passes through a guide 14 mounted upon the swinging feed plate 15 which presents the thread to the thread carrier. Said guide is formed with an irregular slit 16 on one side by which to insert the thread into the guide without threading it through the end. The irregularities of the slit prevent the thread from accidentally jumping sidewise out of the guide. From the narrow end of said guide, the thread is continued down between the swinging feed plate 15 and a spring tension plate 17 which is secured to said feed plate 15 to move therewith and extends over said plate, normally in contact therewith. Said feed and tension plates are each bifurcated, as shown, and in the space between the two fork members of the plates are located the shears 19 which sever the thread. Said thread, shown at 20, passes over pins 21 which are secured to the tension plate 17 and project into holes 22 in the feed plate 15, said pins thus forming guides for the thread to present the same in proper relation to the jaws or nippers of the thread carrier. The inner blade 23 of the shears is fixed, while the outer blade 24 is pivotally mounted, as shown at 25, and the back of said movable blade 24 engages a bridge 26 connecting the two fork members of the tension plate 17 and presses said plate outward when said shears open, thus separating said tension and feed plates and allowing the thread to pass freely therebetween. Upon each blade of the shears is secured a gripper 27 in the form of an elongated loop of spring wire, the inner side of which enters a groove 28 formed in the edge of the opposite blade, and grips the thread against said edge. The spring loops grip the thread just before it is severed and retain the ends of the thread in position to be successively presented to the jaws of the filling carrier.

Figures 4, 5, 5A:
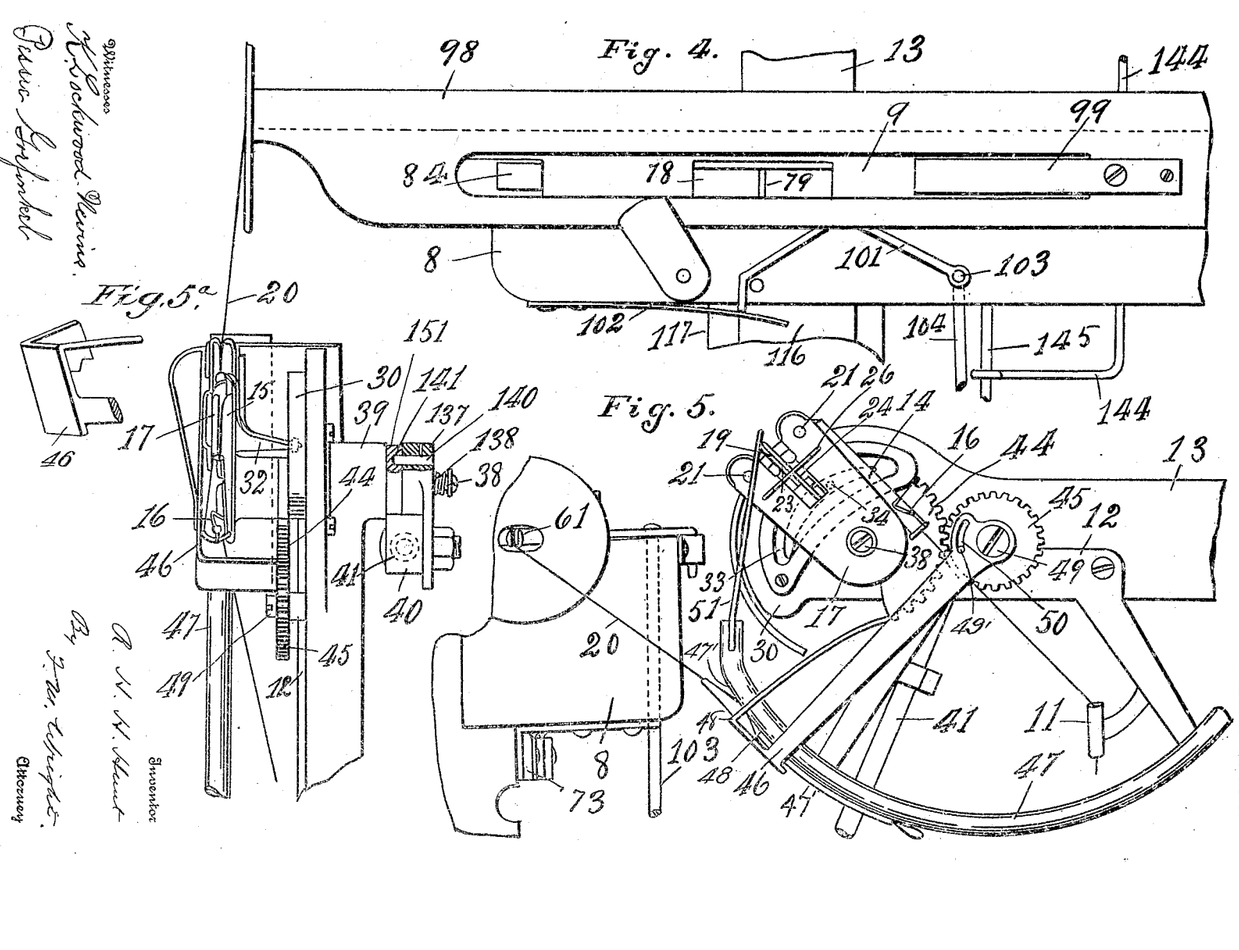
Figure 6:
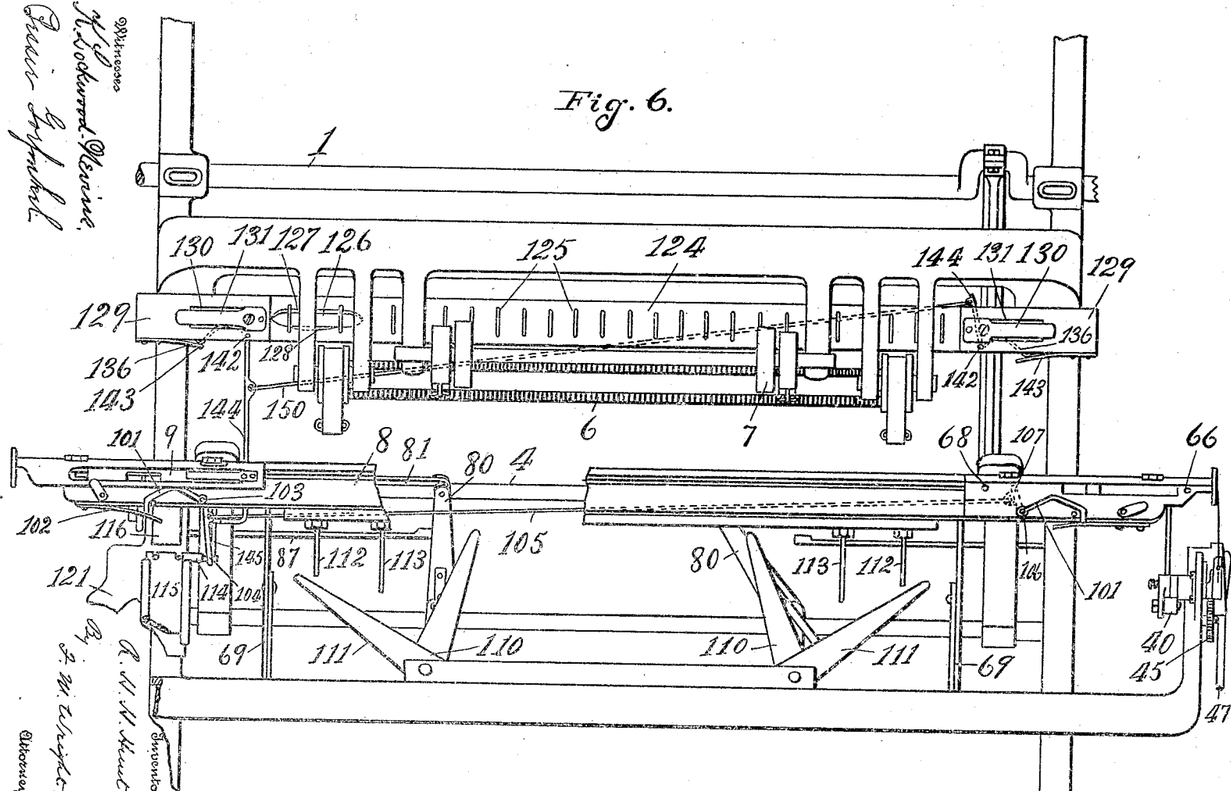
Fig. 6 is a broken plan view of the front of the loom.
Figure 7:
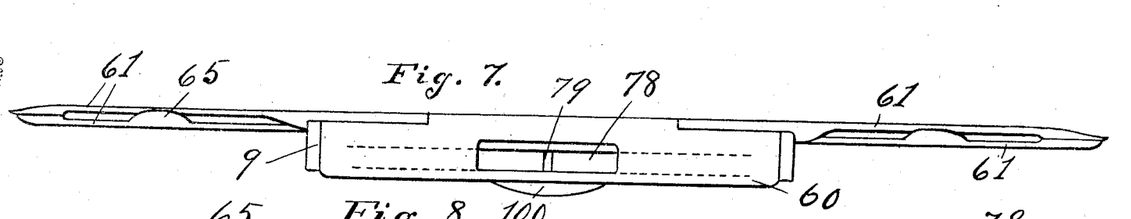
Fig. 7 is a plan view of the thread carrier.
Figures 8, 9, 10, 11, 12, 13, 14:
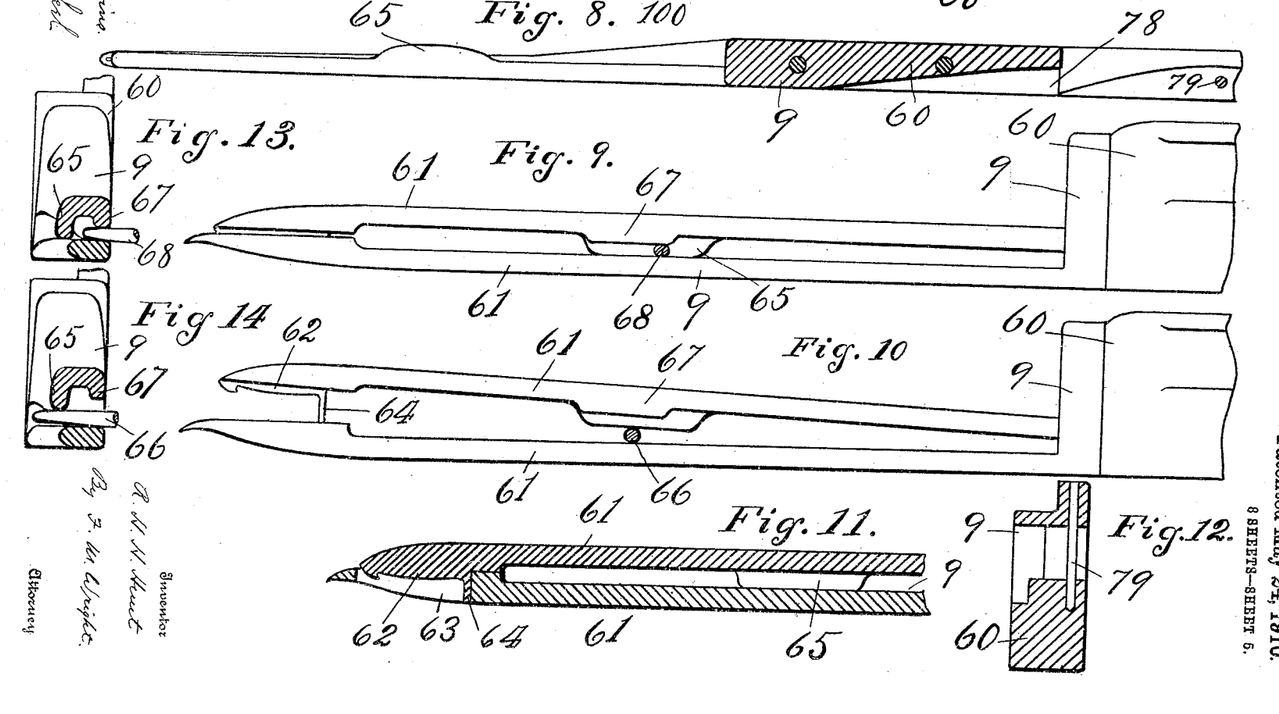
Fig. 8 is an enlarged longitudinal section of one end thereof.
Fig. 9 is an enlarged bottom plan view of one end thereof in the position in which it is engaged by the inner speader.
Fig. 10 is a similar view in the position in which it is engaged by the outer spreader.
Fig. 11 is a longitudinal section of the ends of the fingers.
Fig. 12 is a cross section of the thread carrier.
Fig. 13 is a cross section of the fingers of the thread carrier in the position corresponding to Fig. 9.
Fig. 14 is a similar view in the position corresponding to Fig. 10.
Figures 15, 16:
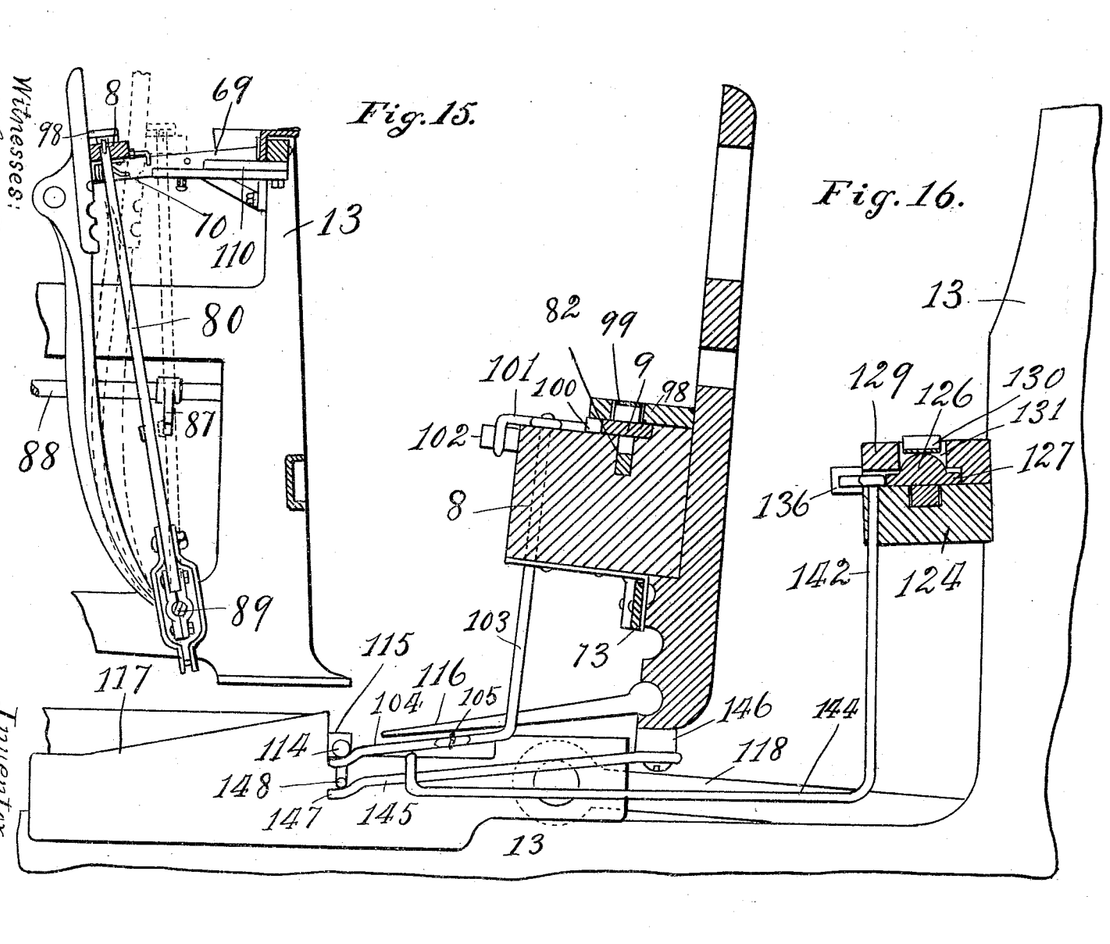
Fig. 15 is a cross section of a part of the machine showing the picker stick in end view.
Fig. 16 is an enlarged cross section through a portion of the machine to show the spreader mechanism.
Figures 17, 18, 19, 20, 21, 22:
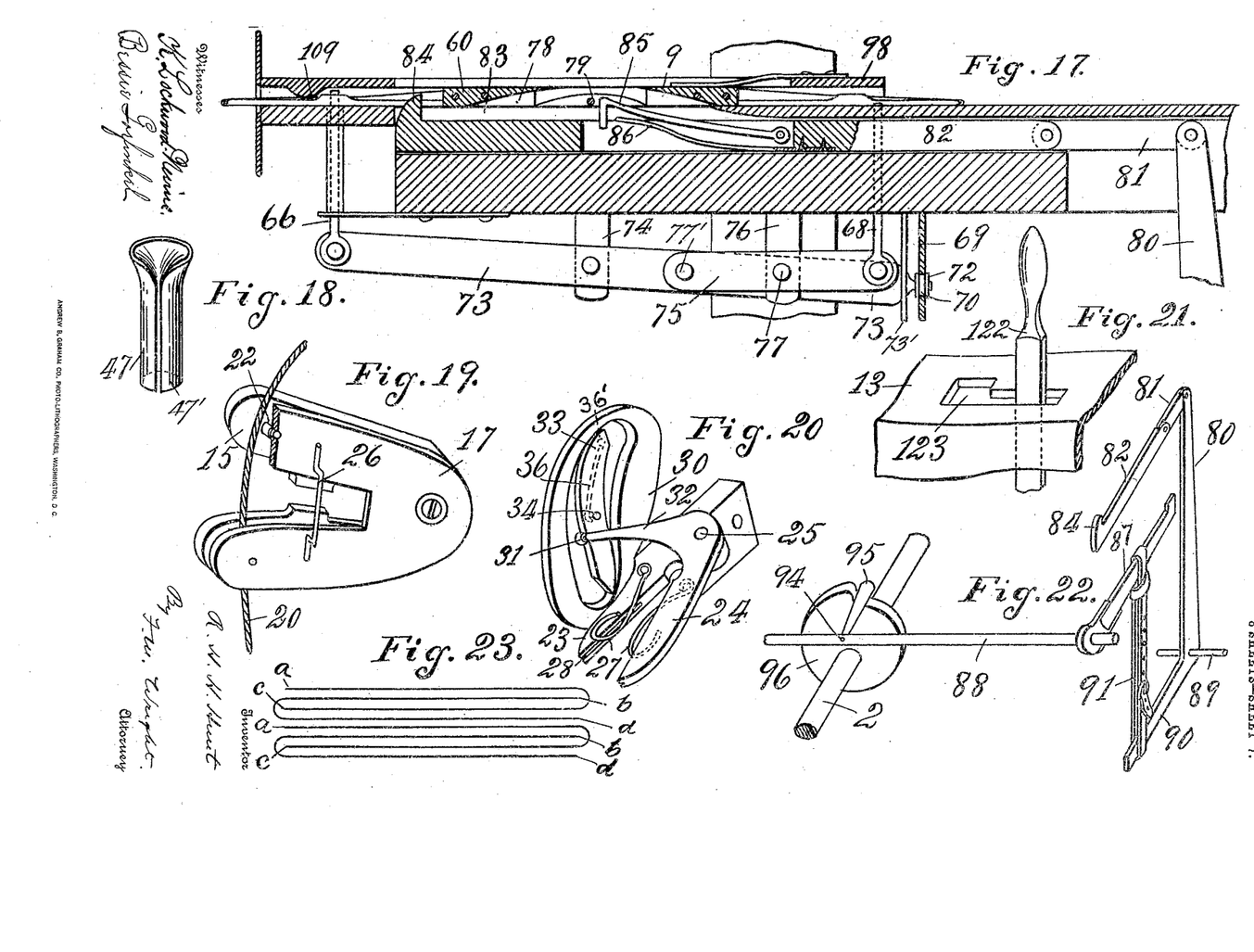
Fig. 17 is a longitudinal section of the lay.
Fig. 18 is a detail view showing the end of the measuring tube broken off the guide arm being omitted.
Fig. 19 is a broken perspective view of the feed plate.
Fig. 20 is a perspective view of the mechanism for operating the shears.
Fig. 21 is a detail view of the shipper handle.
Fig. 22 is a detail perspective view of the mechanism for operating the picker stick.
Figures 24, 25:
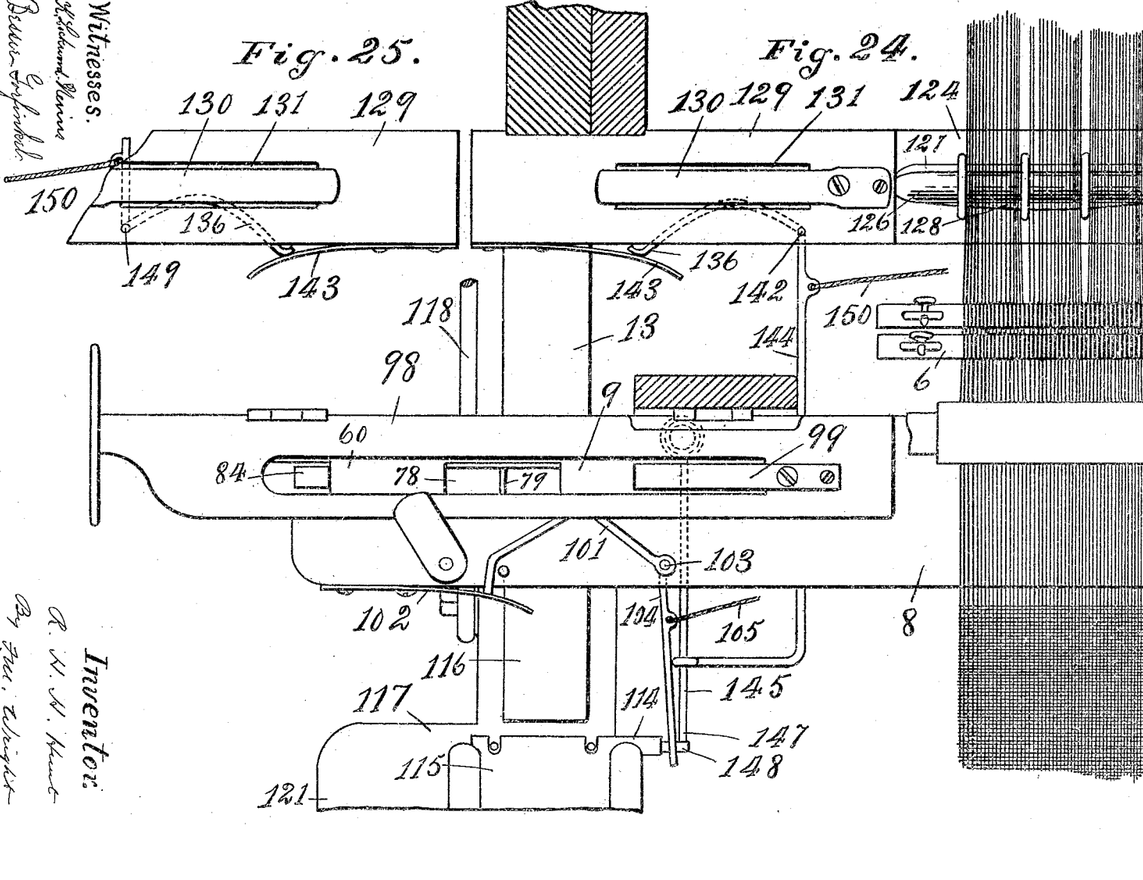
Fig. 24 is an enlarged plan view of an end of the loom to show the protector mechanism.
Fig. 25 is a plan view of the protector mechanism at the opposite end of the loom.

To actuate the movable blade there is provided a cam plate 30 fixedly secured upon the frame of the machine, and there is a roller 31 on the end of an arm 32 extending inward from said movable blade substantially at right angles thereto. As the feed plate rocks upward, said roller 31 travels on the outer side, (that is, the side farthest from the pivot of the feed plate) of a cam switch 33 pivoted as shown at 34, in a cam groove in said plate, the lower end of said cam switch being normally pressed inward or toward the pivot of the feed plate by a spring 36 secured to the pivot pin 34 of said switch and bearing against a pin 36′ on said switch. As the feed plate swings upward, carrying with it the roller 31, the pressure of the tension plate 17 and bridge 26 against the back of the movable blade 24 holds the roller 31 against said switch. When the roller arrives at the top of the outer path of the cam groove it passes between the upper end of said switch and the outer or upper wall of the groove, depressing the upper end of said switch and passing over or around the same. Up to this point the shears have been held open. But when the roller passes around the upper end of the switch into the inner path of the cam groove, and commences its downward or return movement, the blades are moved together, the thread is gripped by the wire loops, and is severed between said loops. The cut ends of the thread are gripped, while the roller is passing down the inner or lower path of the cam groove. When the roller arrives at the end of said lower path and passes the lower end of said switch, it presses the lower end of the switch 33 upward, and passes under the same into its upper path, the lower end of the switch then swinging downward into its original position. Thus when the feed plate is swinging upward the shears are open, they close when the feed plate begins to rock downward, they remain closed while the feed plate is moving downward and then open again when the feed plate moves upward as previously stated. Said feed plate is mounted upon a shaft 38 extending through an arm 39 attached to the frame of the machine, the other end of said shaft carrying slidably mounted thereon a collar 137 pressed inward by a spring 138, and having a pin 140 which enters a hole 141 in the end of a block 151 secured to said shaft 38, so that the collar 137 normally turns with the shaft 38, but by pulling the collar away from said shoulder it may turn freely on the shaft. Said collar has secured thereto a crank 40 attached to a pitman 41 carrying at its lower end a roller 42 working in a groove 43 of a cam secured upon the shaft 4. The shape of this cam groove determines the directions and rates of movement of the feeder and the intervals of rest thereof which enable said feeder (and also the measuring device, which is operated from the feeder, as will be presently explained) to operate in harmony with the thread carrier. Upon the same shaft 38 of the feed plate is secured a segment gear 44, which meshes with a gear wheel 45 loosely mounted upon a shaft 49 secured in the frame of the machine, said gear wheel 45 having secured thereto to rotate therewith a measuring arm 46, which extends first outward or perpendicular to the plane of the gear wheel (see Fig. 4) and then is bent again at right angles to itself or parallel with a radius of the gear wheel (Fig. 5) to a point over a curved measuring tube 47 slotted at its convex side, as shown at 47′, which receives the thread measured by the measurer 46. The arm 46 after passing beyond said measuring tube is bent inward at right angles to itself, and is formed with a V-shaped front edge 48 (Fig. 5ᵃ) to engage the thread and center it opposite to the slot in the tube. The upper end of said measuring tube is formed with the edges of the slot flaring so as to insure the entrance of the thread into said slot. The measuring arm 46 is adjustably secured upon the gear wheel 45 by means of a screw 49′ and a slot 50 in said measuring arm.

51 represents a guide arm which extends upward from the end of the measuring tube and insures the thread being guided into the upper end thereof.

To follow now the movements of the measuring and severing devices during this process, commencing at the time when the thread carrier is about to take the first thread and lay the first half of the first length in the warp, it will be seen that the thread is held between the shears and the upper fork member of the feeder, the end being gripped by the spring wire loop entering the groove in the upper jaw of the shear. The thread extends to this point from the bobbin through the guide 14. The lay 8 is substantially at its most forward position, and the nipper jaws of the thread carrier, (hereinafter described) are about to take the thread. When said nipper jaws take the thread the feeder has arrived at its lowest position, so that the roller 31 has reached the lower end of the inner path of the cam groove. The cam switch has then sprung inward, so that the roller in returning is compelled to take the outer path and to open the shear blades. This also separates the tension plate 17 from the feed plate 15 and allows the thread to pass freely between them, and between the wire loops 27, as it is carried by the thread carrier to the other side of the loom. After this thread has been beaten into the cloth by the forward movement of the lay, and as the thread carrier is returning to lay a thread in from the opposite side, the feeder moves upward, and when the feeder is moving upward the measurer 46 is moving downward. As soon as the feeder has reached its uppermost position, the roller 31 moves into the inner path of the cam groove, and the shear blades move together so that the grippers 27 close into the grooved edges 28 of the blades, gripping the thread which is immediately cut by the shears, the grippers retaining the cut ends. The measurer now returns, as shown in Fig. 4, leaving a sufficient length of thread measured off to be next laid in the warp. The feeder, however, on moving downward stops short of its first position at a point at which the nipper jaws of the thread carrier will take the thread on the far side of the shears. When the thread carrier is thrown the second time to the other side of the loom carrying the last end of the length of thread, the feeder moves on the short distance necessary to bring it into the position first referred to. The operation is then repeated as before. It is to be understood that a similar operation is taking place at the opposite side of the loom, the parts being precisely the same in every respect, the only difference being in the time of the operations on the two sides of the loom, the operations following each other at opposite sides, the operation at the left side being one pick in advance of those at the right side.

My improved thread carrier 9 has a main body portion 60 which is of small thickness in proportion to its width and to said body portion are secured at each end spring fingers 61 which extend substantially parallel with each other, but converge at the ends, as shown, and terminate in points. One of said fingers has a thin rib 62 projecting from its inner surface, said rib entering a groove or slot 63 formed in the other finger, and there is also a pin 64 which by its engagement with said groove serves to center said rib therein. Said fingers spring together so that their ends form nipper jaws to grip the end of the thread very securely. The jaw next the reed is slightly longer than the other. For the purpose of opening said jaws to grip the thread there is formed on the front finger the inwardly extending cam or boss 65 and when the thread carrier has arrived at the proper place for the jaws to open, a spreader rod 66 having a wedge shaped end enters vertically between the two fingers, in front of said cam or boss, said fingers being sufficiently far apart to permit said wedge shaped end to enter. When the thread carrier moves forward to take the thread, the cam shaped part 65 of the front finger and the rear finger passing on each side of the spreader cause said fingers to spread and the jaws to open, in position to take the thread. Below the cam shaped inward projection 65 there is a smaller cam shaped inward extension 67 also from the front finger. This is for the purpose of spreading the fingers to drop the thread, and this smaller extension is actuated by a second spreader 68 which does not rise so high as the first spreader and thus does not rise high enough to engage the wider cam or extension 65. It rises only sufficiently high to engage the lower and smaller extension, but yet it spreads the fingers sufficiently far to allow the end of the thread to be drawn out and around the hook. For the purpose of actuating said spreaders I provide the following construction. 69 represents a plate secured to the frame, suitably braced and extending inwardly underneath the lay. Said plate has formed therein a cam slot 70 which extends downwardly and forwardly, as shown, and in said slot moves a pin 72 on the end of a lever 73, said lever being fulcrumed on a bracket 74 depending from the under side of the lay, the pin, and the end of the lever carrying the same, being suitably supported against forward and backward movement by means of two vertical guide bars 73' depending from the lay, between which the end of the lever has a vertical movement. It will readily be seen that, on account of the forward and downward direction of the slot, when the lay comes forward, the end of the lever 73 drops, and rises again when the lay moves backward. To the opposite end of the lever 73 is secured the spreader 66. The other spreader 68, which has a smaller vertical movement, is secured upon the end of an auxiliary lever 75 fulcrumed at 77 on a bracket 76 depending from the lay, and pivoted as shown at 77 to the lever 73. Thus the forward movement of the lay raises both of said spreaders, but the outer spreader 66 more than the inner spreader 68.

In the main body of the thread carrier is formed a longitudinal slot or opening 78, in the center of which is a transverse pin 79. The picker stick 80 does not engage the thread carrier directly but is connected by a link 81 with a picker 82 which slides in a groove or channel 83 in the lay and has an upwardly extending hook 84 which brings to rest the thread carrier, by engaging the end of the body 60 thereof. Upon said picker is pivoted an upwardly extending latch 85 which is pressed upward by a spring 86. When the thread carrier arrives at said picker, the pin 79 passes over said latch, the latch then immediately springing upward behind the pin and preventing rebound thereof. The picker stick then moves slightly forward with the thread carrier. It is arrested however by means of the same arm 87, secured upon the rock shaft 88, which serves to vibrate the picker stick, said arm 87 being now made of considerable length so that its end arrests the picker stick at the proper time. When said picker 82 returns and arrives at a point in its movement at which it is to impart momentum to the thread carrier, the upper surface of said latch 85 is engaged by the overhanging top of the channel 83 so that the latch is forced thereinto, and the thread carrier can pass freely over the same and escape from the picker and be shot forward therefrom. Said picker stick is pivotally mounted at its lower end upon a bar 89 secured upon the frame of the machine and has an arm 90 extending at right angles thereto which is connected by a strap 91 with a horizontally extending arm 87 upon a rock shaft 88 mounted at the side of the loom, said rock shaft being operated by means of an arm 94 extending inwardly therefrom and having a conical hard rubber roller 95 engaged by a cam 96 on the cam shaft 4. Said cam is very abrupt in its forward or advancing portion, so that the rock shaft is given a sudden rocking movement which transmits a sudden inward movement to the upper end of the stick and throws the thread carrier with great velocity from one side of the loom to the other. An important advantage of the above construction is that the picker sticks are now within the frame of the loom instead of at the outside thereof. Thus the floor space occupied by the loom is greatly reduced laterally, leaving more room to pass between the loom, and permitting of more looms in a factory of given dimensions. When the lay moves forward the picker stick moves forward with it and passes out of engagement with the end of the arm 87 and thus is enabled to advance laterally, which it does under the action of a spring 97 connecting it with the lower end of the other picker stick, which is itself operated by means of the strap 91 and the rock shaft 88. Thus the picker stick and the picker move forward. As the thread carrier arrives at the opposite side of the loom and enters the housing 98, its motion is retarded, first, by means of a spring plate 99 secured to said housing, and then by means of a lateral boss or extension 100 on the thread carrier which engages a bent wire 101 pressed inwardly by a spring 102 and mounted upon the upper end of a vertical rock shaft 103 in the lay, said rock shaft being bent forward at its lower end as shown at 104 and there connected by a wire 105 with a rock shaft 106 at the other end of the loom, similar to the shaft 103 except that the lower end now extends rearwardly as shown at 107 so that said rock shafts move in unison. The object of this is, as will be presently explained, to effect an automatic stoppage of the machine in case the thread carrier does not arrive at said wire 101, by the time the lay has advanced to a predetermined point. Upon the under side of said housing is formed a rib 109 which bears upon the nose of the thread carrier and holds it down to prevent it being lifted by the spreader as the spreader moves up to be in position to open the jaws. When the thread carrier has arrived at this position the rear nipper jaws of the thread carrier have drawn the thread nearly up to the selvage, and it is necessary to lead the thread into the selvage slowly. It is therefore necessary to move the thread carrier forward slowly at this point. For this purpose there are provided, on the front portion of the frame of the machine, bell crank levers 110. One arm 111 of each lever is engaged successively by forward extensions 112, 113 from the lay. The extension 112 engages said arm 111 near the extremity thereof, so as to impart a comparatively slow motion to said arm. The other arm of said lever is thus moved behind the picker stick and pushes it forward, slowly at first, to let go of the thread, when the bell crank lever is engaged by the extension 112, but when the lay has come sufficiently forward for the other extension 113 to engage said arm, then, on account of the point of engagement being much nearer the fulcrum, the forward movement of the lay imparts a much more rapid movement to said arm and to the picker. This rapid movement is for the purpose of moving the thread carried forward quickly, to take a new thread after the end of the thread has been laid in.

Should the thread carrier not reach home in due time by reason of a warp thread breaking in front of the reed, or from other cause, the loom is automatically stopped in the following manner. It has been stated that when the thread carrier arrives at its housing it engages a bent wire 101 actuated by a spring and thus rocks a vertical rock shaft 103. A forwardly projecting arm 104 formed on the lower end of the rock shaft 103 is thus caused to move inwardly, that is, from the side of the loom toward the middle thereof. It thus escapes engagement with a finger 114 formed upon a plate 115. But if the thread carrier should not have reached home as aforesaid when the lay is moved forward, then said end 104 would not escape said finger 114 but would engage it, and, by reason of the end of said arm 104 being inclined or cam-shaped, it would lift said finger and thereby lift said plate 115 into the path of a tongue 116 carried forward with the lay. The effect of throwing up the plate 115 in the path of the tongue 116 is to move said plate 115 forward. Said plate is pivoted on a slide 117 which is attached by means of a bar 118 to the brake 119 so that when the plate moves forward it brings the brake 119 up against the wheel 120. At the same time a finger 121 secured upon an extension of said plate pushes the shipper handle 122 out of a notch 123 in the frame, whereupon the shipper immediately springs inward, throwing the belt from the fast to the loose pulley. It will be observed that this takes place at whichever side of the loom the thread carrier fails to get home in time. For the two vertical rock shafts are connected by the wire 105 running across the loom, so that the rocking of the farther shaft also rocks the nearer, and, on the other hand, should the thread carrier fail to get home in time at the far end, then both vertical rock shafts remain stationary, and the stopping mechanism is set in motion.

I also provide an automatic stopping mechanism behind the harness. This comprises a bar or frame 124 extending the width of the loom behind the harness and having secured thereon at short intervals wire arches 125 extending upward between the threads of the warp and so shaped as to form a guide for an auxiliary flier 126 having flanges 127 which pass underneath corresponding shaped portions of the arches and also has a friction piece 128 which when passing into the housing 129 at each end is arrested by means of a spring 130 pressing upon said piece through a hole 131 in the top of the housing and preventing the rebound. This flier is actuated by means of an auxiliary picker 132 having a rear arm 133 lifted by a stirrup 134 from an arm 135 on the same rock shaft 88 as the main picker is operated by. When the flier 126 arrives at its housing 129 it presses outward the bent arm 136 of a vertical rock shaft 142, said arm being normally pressed inward by a spring 143. Said rock shaft has a lower arm 144 loosely connected with a lever 145, pivoted at 146 upon the under side of the lay frame, said lever 145 having in like manner, as the lever 104 a downwardly and forwardly sloping end 147 which, when the lay is moved forward, lifts a finger 148 extending from the plate 115. Now if the flier has not been obstructed in its passage across the loom, but arrives at its housing in proper time, the downwardly and forwardly sloping end of the lever 145 is swung out from below the finger 148, so that when the lay moves forward it does not engage or lift the same. But if a thread breaks and falls across the path of the flier in its passage in one direction, the thread is moved sidewise across the warp threads, and thus lying across the warp threads prevents the free opening of the warp threads at this place in the next shed. This in turn prevents the flier reaching home in time on its next subsequent pick. Then the end 147 does raise the plate 115, and thus the loom is stopped in like manner as was done by the arm 104. At the other side of the loom the flier rocks a shaft 149 similar to the shaft 142 except that the lower arm of said shaft extends rearwardly instead of forwardly, and is connected by a cord 150 with the arm 144. Thus, at whichever side of the loom the flier fails to reach home in time, the loom is stopped.

I claim:—

1. In a loom, the combination with the lay and the thread carrier having devices for seizing a thread, of a feeder for successively presenting the thread to said devices at different points in the length thereof, and means supported independently of the lay for measuring the distance between said points, substantially as described.

2. In a loom, the combination, with the lay and the thread carrier, of means supported independently of the lay for cutting the thread into lengths, means for measuring the amount of thread to be so cut, and means for presenting the ends of the cut thread to the thread carrier, substantially as described.

3. In a loom, the combination, with the lay and the thread carrier, of means for measuring off a length of thread, means for cutting off the length so measured and means supported independently of the lay for presenting to the thread carrier in succession the cut ends of the thread, substantially as described.

4. The feeding and severing device for feeding the thread to the loom comprising feed and tension plates secured together between which the thread is held, a pair of shears comprising a fixed blade and a movable blade, means for automatically moving said blade outward to open the shears to permit the thread to pass freely therebetween, and a connection between said movable blade and one of said plates to open said plates to permit the thread to pass also freely therebetween, substantially as described.

5. The feeding and severing device for a loom comprising a bifurcated feed plate, a spring tension plate secured thereon and also bifurcated, shears in the space between the forks of the plates, a wire union between the two members of the spring plate, and means for moving a shear blade outward, said blade then engaging said wire union to press said plate outward when the shears open, substantially as described.

6. The feeding and severing devices of a loom comprising the feed plate, the spring plate secured thereon between which plates the thread is held, the shears, means for swinging said plates, and means automatically operated in the movement of said plates for simultaneously opening said plates and shears, substantially as described.

7. In the feeding and severing device for a loom of the character described, the pair of shears, each member of which is provided with two parts, each coöperating with a part upon the opposite jaw in forming two clamping devices for the ends of the thread severed by the shears, substantially as described.

8. In combination with a loom adapted to contain a warp, a means for carrying a thread and laying it in the warp, a feeder for feeding the thread, comprising pivoted jaws, one of said jaws having secured thereon a locking wire, the other jaw having a groove formed in its edge to receive said wire to form a clamping device for the thread, and said jaws being formed with cutting edges, substantially as described.

9. In combination with a loom adapted to contain a warp, a means for carrying a thread and laying it in the warp, a feeder for feeding the thread, comprising pivoted jaws, each jaw having secured thereto a locking wire and having a groove, the locking wire of each jaw being adapted to enter the groove of the other jaw and said jaws being formed with cutting edges, substantially as described.

10. In a loom, the combination, with means for carrying the thread across the loom and laying it in the warp, of a feeder comprising a cutter for the thread, a device carried upon a blade of the cutter for gripping the thread to be cut, a holder close to said gripping device, for holding the thread, and means for shifting the feeder to present to the thread carrier the portion of the thread between said holder and gripping device, substantially as described.

11. In a loom, the combination, with means for carrying the thread across the loom and laying it in the warp, of a feeder comprising a cutter for the thread having devices carried by the co-engaging blades, to grip the end of the cut thread, a holder close to said gripping devices, for holding the thread, and means for shifting the feeder to present to the thread carrier the portion of the thread between said holder and gripping devices, substantially as described.

12. In a loom, the combination, with means for carrying the thread across the loom and laying it in the warp, of a feeder comprising a cutter for the thread, having devices carried by the co-engaging blades to grip the ends of the cut threads on both sides, a resilient device for yieldingly holding the thread a short distance from said gripping devices, and means for shifting the feeder to present to the thread carrier the portion of the thread between said resilient device and gripping devices, substantially as described.

13. In a loom, the combination of a thread carrier for laying the thread in the warp, of a feeder for presenting the thread to the thread carrier comprising a cutter having attached to one blade a spring wire, the other blade having a groove into which said wire enters to grip the thread, said feeder also holding the thread a short distance from said cutter, and means for presenting a portion of the thread between said cutter and holding means to the thread carrier, substantially as described.

14. In a feeding and severing device for a loom, the combination of a rocking feeding plate, shears carried thereon, a cam having a cam groove, a cam latch pivoted in the cam groove, and an arm extending from the movable jaw of the shears into said cam groove and engaged by said latch to change its path in its reciprocation with said rocking feeder to operate said movable jaw, substantially as described.

15. In a feeding and severing device for a loom, the combination of a rocking feeding plate, shears carried thereon, a cam having a cam groove, a spring actuated cam latch pivoted in the cam groove, and an arm extending from the movable jaw of the shears into said cam groove and engaged by said latch to change its path in its reciprocation with said rocking feeder to operate said movable jaw, substantially as described.

16. In a feeding and severing device for a loom, a rocking feeding plate provided with means for holding the thread to be severed, and having secured thereon a pair of shears, the movable jaw of which has an operating arm, an element having a suitably shaped groove, a switch pivoted therein, the end of the operating arm traveling in said groove first on one side of said switch and then in its reverse direction on the outer side thereof, substantially as described.

17. In a feeding and severing device for a loom, a rocking feeding plate provided with means for holding the thread to be severed, and having secured thereon a pair of shears, the movable jaw of which has an operating arm, an element having a suitably shaped groove and a spring actuated switch pivoted therein, the end of the operating arm traveling in said groove first on one side of said latch and then in its reverse direction on the other side thereof, substantially as described.

18. In a feeding and measuring device for a loom, the combination of a feeding device provided with means for holding thread and presenting it to the thread carrier, and also provided with means for severing the thread, and a measuring device for measuring thread to be severed, said measuring device comprising a segment gear rocking with the feed shaft, a gear mounted upon the frame of the loom and meshing the said segment gear and an arm secured to said gear and arranged to engage the thread and draw the same to a predetermined distance to measure the part to be next laid in, substantially as described.

19. In a feeding and measuring device for a loom, the combination of a feeding device provided with means for holding thread and presenting it to the thread carrier, and also provided with means for severing the thread, and a measuring device for measuring the thread to be severed, said measuring device comprising a segment gear rocking with the feed shaft, a gear mounted upon the frame of the machine and meshing with said segment gear and an arm secured to said gear bent at right angles to the plane of the gear wheel and then again parallel with a radius of the gear wheel and arranged to engage the thread and draw the same to a predetermined distance to measure the length to be laid in, substantially as described.

20. In a feeding and measuring device for a loom, the combination of a feeding device provided with means for holding thread and presenting it to the thread carrier, and also provided with means for severing the thread, and a measuring device for measuring the thread to be severed, said measuring device comprising a segment gear rocking with the feed shaft, a gear mounted upon the frame of the machine and meshing with said segment gear and an arm secured to said gear bent at right angles to the plane of the gear wheel and then again parallel with a radius of the gear wheel and a curved measuring tube slotted on its outer surface into which the thread is conducted by said arm, and arranged to engage the thread and draw the same to a predetermined distance to measure the length to be laid in, substantially as described.

21. In a feeding and measuring device for a loom, the combination of a curved slotted measuring tube, a feeding device for presenting the thread to be severed and led in, and means operated by the movement of said feeding device for drawing off a length of thread and leading it into said measuring tube before severing the same, substantially as described.

22. In a feeding and measuring device for a loom, the combination of a curved slotted measuring tube, a feeding device for presenting the thread to be severed or drawn in, and means operated by the movement of said feeding device for drawing off a length of thread and leading it into said measuring tube before severing the same, said means comprising an arm having a V-shaped front edge swinging in an arc of a circle concentric with said measuring tube, the bend of the V being opposite to a slot of said tube, substantially as described.

23. In a feeding and measuring device for a loom, the combination of a curved slotted measuring tube, a feeding device for presenting the thread to be severed and led in, and means operated by the movement of said feeding device for drawing off a length of thread and leading it into said measuring tube before severing the same, said means comprising an arm having a V-shaped front edge swinging in an arc of a circle concentric with said measuring tube, the bend of the V being opposite to a slot of said tube, and means for adjusting the extent of movement of said arm, substantially as described.

In witness whereof I have hereunto set my hand in the presence of two subscribing witnesses.

R. H. H. HUNT.

Witnesses:
FRANCIS M. WRIGHT,
BESSIE GORFINKEL.